United States Patent [19]

Braun

[11] Patent Number: 4,882,951
[45] Date of Patent: Nov. 28, 1989

[54] AUXILIARY TRANSMISSION INPUT SECTION

[75] Inventor: Eugene R. Braun, Royal Oak, Mich.

[73] Assignee: Eaton Corporation, Cleveland, Ohio

[21] Appl. No.: 167,944

[22] Filed: Mar. 14, 1988

[51] Int. Cl.$^4$ .............................. F16H 3/02; F16H 3/08
[52] U.S. Cl. ........................................ 74/745; 74/329; 74/360
[58] Field of Search ............... 74/745, 329, 324, 359, 74/360; 192/30 W

[56] References Cited

U.S. PATENT DOCUMENTS

| | | | |
|---|---|---|---|
| 1,996,256 | 4/1935 | Price et al. | 192/30 W |
| 2,529,393 | 11/1950 | Hogue | 74/745 X |
| 2,729,119 | 1/1956 | Alcock | 74/745 X |
| 2,738,690 | 3/1956 | Perkins | 74/745 |
| 2,886,982 | 5/1959 | Thomas | 74/745 |
| 2,972,899 | 2/1961 | Wiggermann | 74/329 |
| 3,741,035 | 6/1973 | May | 74/745 |
| 4,018,319 | 4/1977 | Thomas | 192/53 E |
| 4,023,418 | 5/1977 | Zenker | 74/745 X |
| 4,081,065 | 3/1978 | Smyth et al. | 192/0.076 |
| 4,291,794 | 9/1981 | Bauer | 192/113 B X |
| 4,340,133 | 7/1982 | Blersch | 192/30 W |
| 4,354,400 | 10/1982 | Baker | 74/687 |
| 4,361,060 | 11/1982 | Smyth | 74/866 |
| 4,373,403 | 2/1983 | Malott et al. | 74/337.5 |
| 4,432,251 | 2/1984 | Malott | 74/337.5 |
| 4,440,279 | 4/1984 | Schreiner | 192/30 W |
| 4,485,692 | 12/1984 | Moore et al. | 74/745 |
| 4,498,356 | 2/1985 | Vater et al. | 74/745 |
| 4,532,827 | 8/1985 | Beim | 74/745 |
| 4,625,841 | 12/1986 | Klatt | 192/30 W X |
| 4,640,146 | 2/1987 | Buback | 74/745 X |
| 4,648,290 | 3/1987 | Dunkley et al. | 74/866 |
| 4,686,869 | 8/1987 | Beim | 74/745 |
| 4,700,823 | 10/1987 | Winckler | 192/113 B X |

FOREIGN PATENT DOCUMENTS

| | | | |
|---|---|---|---|
| 1094811 | 12/1967 | United Kingdom | 74/745 |
| 2063395 | 6/1981 | United Kingdom | 74/745 |

Primary Examiner—Leslie A. Braun
Assistant Examiner—William Gehris
Attorney, Agent, or Firm—H. D. Gordon

[57] ABSTRACT

A compound transmission (14) comprising an input auxiliary section (18) and a main mechanical change gear transmission (20) is provided. The auxiliary section (18) utilizes friction clutch means (50) having a first and second selectable position for engaging a direct drive or reduction input ratio and a third disengaged position allowing the auxiliary section to provide the torque break function normally provided by a master clutch. Preferably, a positive clutch disconnect (66) is interposed between the friction clutch assembly and the main transmission section (20) to provide reduced main transmission section inertia to provide quicker, easier and and lower energy synchronization of the main transmission.

21 Claims, 2 Drawing Sheets

AUXILIARY TRANSMISSION INPUT SECTION

RELATED APPLICATION

This application is related to Ser. No. 168028 filed the same day as this application, titled COMPOUND TRANSMISSION STRUCTURE, and assigned to the same assignee as this application.

BACKGROUND OF THE INVENTION

1. Field of the Invention

The present invention relates to a compound change gear vehicular transmission having an input auxiliary section, preferably of the splitter type, connected in series with a mechanical main transmission section, preferably of the synchronized type. In particular, the present invention relates to a compound change gear transmission having an input auxiliary section utilizing selectively and modulatably engagable and disengagable friction clutches having an input non-disengagably drivingly mechanically connected to the vehicle prime mover whereby the auxiliary section friction clutches, in addition to allowing auxiliary section gear changing, provide the engagement/disengagement functions of a master clutch.

2. Description of the Prior Art

Compound mechanical transmissions of the input splitter type and compound transmissions utilizing input auxiliary sections having friction clutch devices are known in the art as may be seen by reference to U.S. Pat. Nos. 4,485,692; 2,886,982 and 3,741,035, the disclosures of which are hereby incorporated by reference.

Automatic and semi-automatic transmission and clutch controls are known in the prior art as may be seen by reference to U.S. Pat. Nos. 4,648,290; 4,361,060 and 4,081,065, the disclosures of which are hereby incorporated by reference.

Synchronized mechanical change gear transmissions and transmission sections are well known in the prior art as may be seen by reference to U.S. Pat. Nos. 4,432,251; 4,373,403 and 4,018,319, the disclosures of which are hereby incorporated by reference.

While compound mechanical (i.e. engaging ratios by means of positive clutches) change gear transmissions having input auxiliarY sections of the splitter type and/or using friction clutches are know, such transmissions have required the use of a disconnect member, such as a master clutch or torque converter, between the transmission and prime move and/or have been of a relatively high inertia resulting in more difficult and/or higher energy synchronization of the main transmission section.

SUMMARY OF THE INVENTION

In accordance with the present invention, the drawbacks of the prior art are minimized or overcome by the provision of a compound vehicular transmission comprising an input auxiliary section, preferably of the splitter type, connected in series between the vehicle engine and the mechanical main transmission section, preferably a synchronized type transmission section. The auxiliary input section utilizes a friction clutch, preferably a liquid lubricated and/or cooled friction clutch having an input that is nondisengagably mechanically connected to the engine. The auxiliary section friction clutch has at least two selectable engaged positions for selection of one of two selectable input ratios and a selectable disengaged position. By moving the auxiliary section friction clutch between its selected engaged position and the disengaged position, the torque break function of a master clutch is provided.

The auxiliary section friction clutch is positioned by either the controller of an automatic/semi-automatic transmission system or by an electrical/mechanical actuator responsive to manual transmission and clutch control devices. Preferably, a mechanical disconnect, such as a jaw clutch, is provided between the auxiliary input section friction elements and the main transmission section input to allow the rotational inertia of the main transmission section input to be minimized for easier, quicker, lower energy synchronization of the main transmission section during a main transmission section ratio change.

Accordingly, it is an object of the present invention to provide a new and improved compound transmission having an input auxiliary section utilizing selectively engaged/disengaged friction clutch means and drivingly mechanically nondisengagably connected to a prime mover.

This and other objects and advantages of the present invention will become apparent from a reading of the detailed description of the preferred embodiments taken in connection with the attached drawings.

DESCRIPTION OF THE PREFERRED EMBODIMENT

Figure 1:
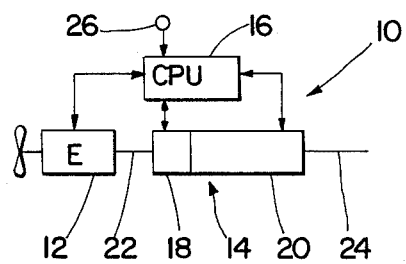
FIG. 1 is a schematic illustration of an automatic or semi-automatic mechanical transmission system utilizing the auxiliary transmission input section of the present invention.

Certain terminology will be used in the following description for convenience and reference only and will not be limiting. The words "upperly", "downwardly", "rightwardly" and "leftwardly" will designate directions in the drawings to which reference is made. The words "forward" and "rearward" will refer respectively to the front and rear end of the transmission as same as conventionally mounted in the vehicle, being respectively from left to right sides of the transmission as illustrated in FIG. 1. The words "inwardly" and "outwardly" will refer to directions toward and away from, respectively, being the geometric center of the device and designated parts thereof. Said terminology will include the words above specifically mentioned, derivatives thereof and words with similar import.

The term "compound transmission" is used to designate a transmission having a main transmission section and an auxiliary transmission section connected in series whereby the selected gear reduction in the main transmission section may be compounded by further selected gear reduction in the auxiliary transmission portion. The term "input auxiliary section" is used to designate auxiliary transmission section connected in series between the vehicular prime mover, such as a vehicle engine, and the input to the main transmission section. The term "splitter type compound transmission" as used herein will designate the compound transmission wherein the auxiliary transmission is used to provide various selectable steps for subdivisions of the gear ratio selected in the main transmission section. In a splitter type compound transmission, the main transmission section is typically provided with relatively wide ratio steps which are split or subdivided by the splitter type auxiliary transmission section. Splitter type compound transmissions are well known in the prior art and examples thereof may be seen by to reference to the above-mentioned U.S. Pat. Nos. 4,485,692 and 3,741,035 and by reference to European Pat. No. 0071353 hereby incorporated by reference.

The term "synchronized transmission section" shall designate a change gear transmission section wherein a selected gear is non-rotatably coupled to a shaft by means of a positive clutch, attempted engagement of said clutch is prevented until the members of said clutch are rotating at a substantially synchronous rotational speed and frictional means associated with the clutch members are sufficient, upon the initiation of a clutch engagement, to cause the clutch members, and all members rotating therewith, to rotate at a substantially synchronous speed of rotation.

An automatic/semi-automatic mechanical transmission system 10 utilizing the auxiliary input section of the present invention may be seen by reference to FIG. 1. Briefly, a vehicular prime mover such as engine 12 is drivingly coupled to compound change gear transmission 14 which comprises an input auxiliary transmission section 18 connected in series with mechanical change gear main transmission section 20. A transmission input shaft 22 mechanically drivingly connects, in a nondisengagable manner, the vehicular engine 12 with the transmission 14 while a transmission output shaft 24 is drivingly connected to the vehicular drive wheels as is well known in the prior art.

A central processing unit 16 receives input signals from the main transmission section 20, the auxiliary transmission section 18, the engine 12 and other input devices 26, such as throttle position, gear selection position and like sensors and processes the same in accordance with predetermined logic rules to generate command output signals to actuators provided in the engine and transmission for automatic or semi-automatic operation of transmission system 10. Automatic/semi-automatic mechanical transmission systems and the sensors, actuators and controller associated therewith are known in the prior art and may be appreciated in greater detail by reference to above-mentioned U.S. Pat. Nos. 4,648,290; 4,361,060 and 4,081,065.

Figure 3:
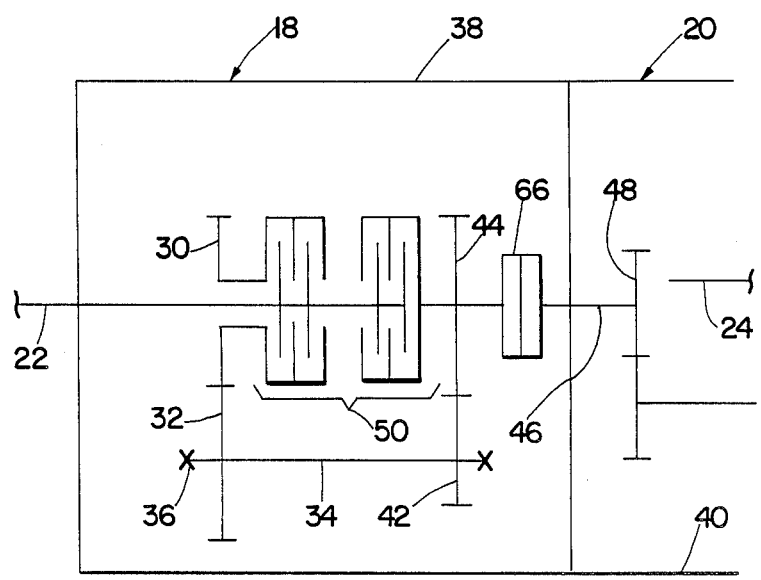
FIG. 3 is an enlarged schematic illustration of the auxiliary transmission input section of the present invention.
Figure 5:
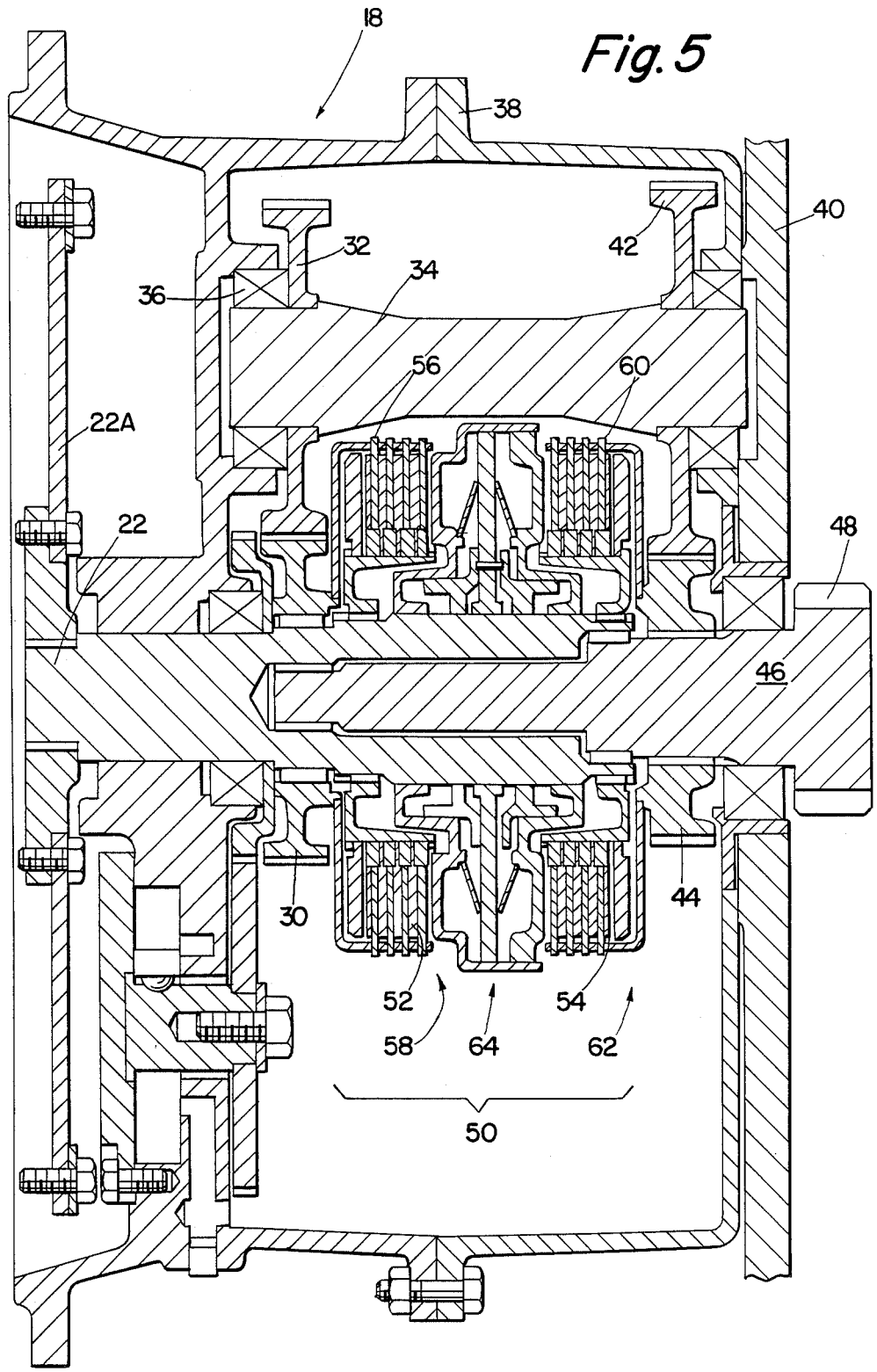
FIG. 5 is a sectional view of the auxiliary transmission input section of the present invention.

A schematic illustration and a sectional view of the detailed structure of the input auxiliary transmission section 18 may be seen by reference to FIGS. 3 and 5. Briefly, transmission input shaft 22 is mechanically non-disengagably connected to the vehicular engine. A plate 22A may be fixed to shaft 22 for mounting to the engine flywheel. The transmission input shaft 22 carries an auxiliary section input gear 30 rotationally movable relative thereto which is constantly meshed with auxiliary section countershaft gear 32 carried by auxiliary section countershaft 34. Auxiliary section countershaft 34 is supported by bearings 36 in auxiliary section housing 38 which is preferably attached to and/or integral with main transmission section housing 40. The auxiliary section countershaft 34 also carries a second auxiliary section countershaft gear 42 which is constantly meshed with auxiliary section output gear 44. The auxiliary section output gear 44 is rotatably fixed to auxiliary section output shaft 46 which defines the input to main transmission section 18 and carries the main transmission section input gear 48 fixed thereto. Preferably, main transmission section 18 is a simple transmission of the synchronized transmission type as is well known in the prior art and as may be appreciated in greater detail by reference to above-mentioned U.S. Pat. Nos. 4,432,251; 4,373,403 and 4,018,319.

The auxiliary input transmission section 18 includes a friction clutch assembly 50 having a first position for frictionally drivingly connecting transmission input shaft 22 to the auxiliary transmission output shaft 46 and output gear 44 while allowing free rotation between the input shaft 22 and input gear 30 to provide a one-to-one ratio, or direct drive relationship, between input shaft 22 and auxiliarY section output shaft 46. In a second position of clutch assembly 50, input shaft 22 is rotationally disengaged from auxiliary section output shaft 46 and auxiliary output gear 44 and is rotationally coupled to auxiliary section input gear 30 to provide a selectable speed reduction between the auxiliary section output shaft 46 as compared to the rotational speed of input shaft 22. Preferably, as discussed above, the gear reduction obtained in the second position of clutch assembly 50 will be less than the average ratio step of the main transmission section, preferably equal to approximately the square root of the average main transmission section ratio step, whereby auxiliary transmission section 18 will be a splitter tYpe input auxiliary transmission section for main transmission section 20 of compound transmission 14.

The clutch assembly 50 will also have a third disengaged position wherein the input shaft 22 is independently rotatable of the auxiliary section output shaft 46.

Preferably, the central processing unit 16 will be provided with logic rules whereby the clutch assembly 50 may be selectively positioned from the selected one of the first and second position thereof and the third disengaged position allowing the clutch assembly to function in a manner functionally comparable to a vehicular master clutch in providing a break in torque between the vehicle engine and the main transmission section 20. Preferably, to provide adequate vehicle start from stop operation, the clutch will be engaged and disengaged in a controlled modulated manner as set forth in above-mentioned U.S. Pat. No. 4,081,065.

Referring now specifically to the structure of clutch assembly 50, auxiliary section input shaft 22, carries a first set 52 and a second set 54 of clutch discs rotationally fixed thereto, input gear 30 carries a plurality of clutch discs 56 interleaved with clutch discs 52 to define a clutch disc pack 58. Auxiliary section output gear 44 carries a plurality of friction clutch discs 60 for rotation therewith which clutch discs are interleaved with clutch disc 54 to define a second clutch disc pack 62. A three position actuator 64 is provided for engaging disc pack 58 for coupling input shaft 22 to input gear 30, for engaging disc pack 62 for coupling auxiliary section input shaft 22 to auxiliary section output shaft 46 or for maintaining both of the disc packs 58 and 62 in the disengaged positions thereof. Actuator 64 may be mechanical, pneumatic, or the like. Preferably, clutch assembly 50 is enclosed within a housing 38, is liquid cooled and utilizes friction material containing substantially pyrolytic carbon. Wet or liquid cooled friction clutches of this type are known in the prior art and may be seen in greater detail by reference to U.S. Pat. No. 4,291,754, the disclosure of which is hereby incorporated by reference.

Of course, gear 30 could be rotationally fixed to shaft 22 and gear 44 rotatable relative to shaft 46 and frictionally coupable thereto.

To lower the rotational inertia of the auxiliary section output shaft 46 to provide easier, quicker and lower energy synchronization of main transmission section 20, a positive clutch device, such as jaw clutch 66 (illustrated in FIG. 3 only) is provided in auxiliary output shaft 46 interposed between the auxiliary section clutch assembly 50 and the main transmission section input gear 48. Briefly, during a shift transcend in main transmission section 20, the mechanical coupling 66 will be opened to disengage the rearward portion of auxiliary section output shaft 46 from the rotational inertia of the auxiliary section clutch assembly 50. Preferably, with the clutch assembly 50 in the disengaged position, the coupling 66 may be easily re-engaged after achievement of a synchronous engagement of a selected gear in the main transmission section 20 without requiring synchronization of the members thereof due to the relatively low inertia of the forward portion of auxiliary section output shaft 41.

Figure 2:
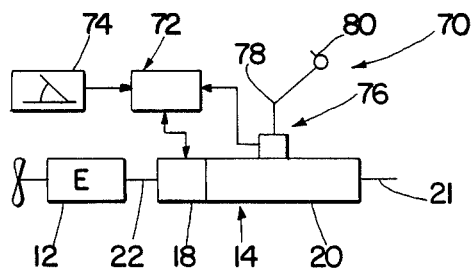
FIG. 2 is a schematic illustration of a manually controlled transmission system utilizing the auxiliary transmission input section of the present invention.

An alternate embodiment of the present invention may be seen by reference to FIGS. 2 and 3. Briefly, FIG. 2 illustrates a manually controlled transmission system 70 utilizing the compound transmission 14 discussed above in connection with FIG. 1. Briefly, control of the auxiliary section clutch 50 and, if utilized, a positive disconnect coupling 66, is by means of a controller 72 which is responsive to input signals from the clutch pedal 74 and from the shift selector lever 76 which comprises a shift lever 78 for shifting the main transmission section and the switch 80 for selecting the direct drive or gear reduction ratio of the input auxiliary transmission section 18. Briefly, selector switch 80 will determine which of the clutch packs 58 or 62 is to be selectively engaged or disengaged while the position of clutch pedal 74 will determine the degree of engagement or disengagement of the selected clutch pack. Should mechanical disconnect 66 be utilized with transmission 70, a sensor may be provided for sensing a gear change in the main transmission section 20 for causing control 72 to cause the coupling 66 to assume the disconnect position thereof.

Figure 4:
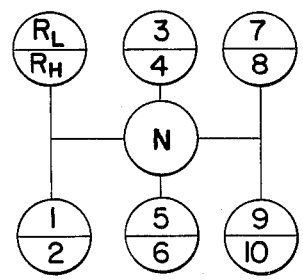
FIG. 4 is a schematic illustration of the shift pattern of the transmission illustrated in FIG. 2.

The shift pattern for transmission system 70 may be seen by reference to FIG. 4.

It is understood, of course, that the present invention is not limited to the particular embodiments illustrated and described above but also includes modifications and rearrangement of the parts within the scope of the following claims.

I claim:

1. An input auxiliary transmission system (18) for a compound vehicular transmission (14) system comprising an auxiliary transmission section connected in series between a vehicular prime mover (12) and a change gear mechanical main transmission section (20), said auxiliary section characterized by:

an input shaft (22) non-disengagably mechanically drivingly connected to said vehicular prime mover, an auxiliary section output shaft (46) and a three position friction clutch (50) having a first position for coupling said auxiliary output shaft to said input shaft at a first speed ratio, or second position for coupling said input shaft to said auxiliary section output shaft at a second speed ratio and a third position allowing independent rotation of said input shaft and auxiliary section output shaft; and a selectively engagable and disengagable disconnect coupling (66) drivingly interposed between said friction clutch and the main transmission section.

2. The input auxiliary section of claim 1 wherein said disconnect coupling (66) comprises a positive jaw clutch member.

3. The input auxiliary transmission system of claim 2 wherein said auxiliary transmission system includes means for sensing operator selection of a desired one of said first speed ratio or said second speed ratio to determine which of said first position or said second position the friction clutch should be positioned.

4. The input auxiliary transmission system of claim 2 additionally including means for sensing the operator's positioning of a manual clutch pedal to determine the amount of engagement of said friction clutch in said first or second position.

5. The input auxiliary transmission system of claim 3 additionally including means for sensing the operator's positioning of a manual clutch pedal to determine the amount of engagement of said friction clutch in said first or second position.

6. The input auxiliary transmission system of claim 2 wherein said auxiliary section has an input gear (30) an auxiliary section countershaft (34) assembly having rotationally fixed thereto a first countershaft gear (32) meshed with said input gear and a second countershaft gear (42) meshed with an auxiliary section output gear (44), connected to said auxiliary output shaft (46), drivingly connected to said main transmission section, said output gear fixed to said output shaft, said three position friction clutch in said first position coupling said auxiliary output shaft to said input shaft by connecting auxiliary section output gear 44 to the input shaft at said first speed ratio and in said second position coupling said input shaft to said input gear which transmits power through said first countershaft gear, said countershaft and second countershaft gear to said auxiliary section output gear and output shaft at said second speed ratio.

7. The input auxiliary transmission system of claim 3 wherein said auxiliary section has an input gear (30) an auxiliary section countershaft (34) assembly having rotationally fixed thereto a first countershaft gear (32) meshed with said input gear and a second countershaft gear (42) meshed with an auxiliary section output gear (44) connected to said auxiliary output shaft (46), drivingly connected to said main transmission section, said output gear fixed to said output shaft, said three position friction clutch in said first position coupling said auxiliary output shaft to said input shaft by connecting auxiliary section output gear 44 to the input shaft at said first speed ratio and in said second position coupling said input shaft to said input gear which transmits power through said first countershaft gear, said countershaft and second countershaft gear to said auxiliary section output gear and output shaft at said second speed ratio.

8. The input auxiliary transmission system of claim 4 wherein said auxiliary section has an input gear (30) an auxiliary section countershaft (34) assembly having rotationally fixed thereto a first countershaft gear (32) meshed with said input gear and a second countershaft gear (42) meshed with an auxiliary section output gear (44), connected to said auxiliary output shaft (46), drivingly connected to said main transmission section, said output gear fixed to said output shaft, said three position friction clutch in said first position coupling said auxiliary output shaft to said input shaft by connecting auxiliary section output gear 44 to the input shaft at said first speed ratio and in said second position coupling said input shaft to said input gear which transmits power through said first countershaft gear, said countershaft and second countershaft gear to said auxiliary section output gear and output shaft at said second speed ratio.

9. The input auxiliary transmission system of claim 5 wherein said auxiliary section has an input gear (30) an auxiliary section countershaft (34) assembly having rotationally fixed thereto a first countershaft gear (32) meshed with said input gear and a second countershaft gear (42) meshed with auxiliary section output gear (44), connected to said auxiliary output shaft (46), drivingly connected to said main transmission section, said output gear fixed to said output shaft, said three position friction clutch in said first position coupling said auxiliary output shaft to said input shaft by connecting auxiliary section output gear 44 to the input shaft at said first speed ratio and in said second position coupling said input shaft to said input gear which transmits power through said first countershaft gear, said countershaft and second countershaft gear to said auxiliary section output gear and output shaft at said second speed ratio.

10. The input auxiliary transmission system of claim 2 wherein said transmission is a splitter type transmission.

11. The input auxiliary section of claim 3 wherein the main transmission section is a synchronized transmission section.

12. The input auxiliary section of claim 7 wherein the main transmission section is a synchronized transmission section.

13. The input auxiliary transmission section of claim 2 wherein said friction clutch is a liquid cooled clutch.

14. The input auxiliary section of claim 13 where said friction clutch utilizes friction material comprising of pyrolytic carbon.

15. An input auxiliary transmission system (18) for a compound vehicular transmission (14) system comprising an auxiliary transmission section connected in series between a vehicular prime mover (12) and a change gear mechanical main transmission section (20), said auxiliary section characterized by:

an input shaft non-disengagably mechanically drivingly connected to said vehicular prime mover (12), an input gear (30) independently rotatable of said input shaft, an auxiliary section countershaft (34) assembly having rotationally fixed thereto a first countershaft gear (32) meshed with said input gear and a second countershaft gear (42) meshed with an auxiliary section output gear (44), an auxiliary output shaft (46) drivingly connected to said main transmission section, and said output gear rotationally fixed to said output shaft, and a three position friction clutch (50) having a first position for coupling said auxiliary output shaft to said input shaft, a second position for coupling the said input gear to said input shaft and said auxiliary output shaft and a third position allowing independent rotation of said auxiliary output shaft and said input shaft; and a selectively engagable and disengagable disconnect coupling (66) drivingly interposed between said friction clutch and the main transmission section.

16. The input auxiliary section of claim 15 wherein said disconnect coupling (66) comprises a positive jaw clutch member.

17. The input auxiliary transmission system of claim 16 wherein said transmission is a splitter type transmission.

18. The input auxiliary section of claim 17 wherein the main transmission section is a synchronized transmission section.

19. The input auxiliary transmission section of claim 16 wherein said friction clutch is a liquid cooled clutch.

20. The input auxiliary section of claim 19 with said friction clutch utilizes friction material comprising of pyrolytic carbon.

21. The auxiliary section of claim 17 where said friction clutch comprises a first clutch disc pack engaged in said first clutch position and a second clutch disc pack engaged in said second clutch position, said transmission systems including means for sensing operator selection of a desired input auxiliary section ratio to determine which of said first and second clutch disc pack is to be selectively engaged and disengaged and for sensing the operator's positioning of a manual clutch pedal to determine the amount of engagement of the selected clutch pack to be engaged and disengaged.

* * * * *